(12) United States Patent
Ohkubo et al.

(10) Patent No.: US 8,305,576 B2
(45) Date of Patent: Nov. 6, 2012

(54) APPARATUS AND METHOD FOR MEASURING TOTAL LUMINOUS FLUX

(75) Inventors: Kazuaki Ohkubo, Kusatsu (JP); Shunsuke Mishima, Koka (JP)

(73) Assignee: Otsuka Electronics Co., Ltd., Hirakata-Shi (JP)

( * ) Notice: Subject to any disclaimer, the term of this patent is extended or adjusted under 35 U.S.C. 154(b) by 419 days.

(21) Appl. No.: 12/779,045

(22) Filed: May 13, 2010

(65) Prior Publication Data
US 2010/0296082 A1 Nov. 25, 2010

(30) Foreign Application Priority Data
May 22, 2009 (JP) ................................. 2009-124250

(51) Int. Cl.
*G01J 1/00* (2006.01)

(52) U.S. Cl. ......... 356/326; 356/213; 250/228; 250/230

(58) Field of Classification Search .................. 356/236, 356/213, 445, 446; 250/228, 230
See application file for complete search history.

(56) References Cited

U.S. PATENT DOCUMENTS

| 6,995,355 | B2 * | 2/2006 | Rains et al. | 250/228 |
| 7,508,503 | B2 * | 3/2009 | Jang | 356/236 |
| 7,663,744 | B2 * | 2/2010 | Ohkubo | 356/236 |
| 7,891,854 | B2 * | 2/2011 | Hamada | 362/612 |

FOREIGN PATENT DOCUMENTS

| JP | 6-167388 | 6/1994 |
| JP | 7-146175 | 6/1995 |
| JP | 2004-237602 | 8/2004 |

* cited by examiner

*Primary Examiner* — Layla Lauchman
(74) *Attorney, Agent, or Firm* — Ditthavong Mori & Steiner, P.C.

(57) ABSTRACT

In a total luminous flux measurement apparatus according to an embodiment, a total luminous flux emitted by an object is calculated based on a result of measuring illuminances using a measuring unit when providing relative movement between the object and an integrating unit to expose a substantially entire light emitting surface of the object to an inner space of the integrating unit. Specifically, under conditions that the object is disposed to penetrate the integrating unit from one sample hole to the other sample hole, a luminous flux of a portion of the object within the inner space of the integrating unit is measured, then the integrating unit is moved relative to the object, and a luminous flux of a portion accordingly contained in the inner space of the integrating unit is measured.

9 Claims, 8 Drawing Sheets

APPARATUS AND METHOD FOR MEASURING TOTAL LUMINOUS FLUX

BACKGROUND OF THE INVENTION

1. Field of the Invention

The present invention relates to a total luminous flux measurement apparatus and a total luminous flux measurement method both for measuring a total luminous flux emitted from an object, in particular, to a configuration suitable for measurement of a total luminous flux emitted from a bar-shaped illuminant.

2. Description of the Background Art

Conventionally, a total luminous flux (lm: lumen) has been used as an index for evaluating performances of light sources used in lighting apparatuses. A spherical integrating photometer employing an integrating sphere is known as an apparatus for measuring a total luminous flux with higher accuracy. In the integrating sphere of the spherical integrating photometer, a light source is placed and lit up. A luminous flux from the light source therein is repeatedly reflected by a diffusing and reflecting material (such as barium sulfate or PTFE (polytetrafluoroethylene)) applied to the inner wall of the integrating sphere. This repeated reflection provides a uniform illuminance to the surface of the inner wall of the integrating sphere. The illuminance of the surface of the inner wall of the integrating sphere is proportional to the total luminous flux from the light source. Based on this fact, the illuminance of the surface of the inner wall of the integrating sphere is measured, and the measured value is compared with an illuminance obtained in advance by using a standard light source. In this way, the total luminous flux from the light source subjected to the measurement is determined.

As a prior art concerned with such a spherical integrating photometer, Japanese Patent Laying-Open No. 07-146175 discloses a total luminous flux measurement apparatus including an integrating sphere and a cooling device for the integrating sphere. An object of this total luminous flux measurement apparatus is to achieve stable and accurate measurement by cooling the integrating sphere to a certain temperature when a lamp to be measured is lit up with a constant electric power.

Japanese Patent Laying-Open No. 06-167388 discloses an integrating photometer that employs a hemispherical type integrating unit including an integrating hemisphere having a hemispherical inner wall to which a light diffusing and reflecting material is applied, and a planar mirror extending through the center of curvature of an inner hemisphere of the integrating hemisphere and provided to cover an opening of the integrating hemisphere.

By using each of the above-described spherical integrating photometers, a total luminous flux from a bar-shaped light source such as a straight tube fluorescent lamp may be measured. In this case, however, the integrating sphere needs to have an inner diameter 1.2 times greater than the length of the light source. A reason for this is as follows. As a light emitting portion of the light source comes closer to the surface of the wall of the integrating sphere, light reflected by the surface of the wall comes back to and enters the light source to cast a shadow, which introduces an error to a measured value.

For example, in order to measure a total luminous flux of a 40 W (watt) straight tube fluorescent lamp generally used in schools and offices and having a longitudinal length of approximately 1.2 m, an integrating sphere having its inner diameter of 1.5 m or greater is required. Meanwhile, a 110 W straight tube fluorescent lamp generally used in station buildings and the like has a longitudinal length of approximately 2.4 m. Hence, in order to measure a total luminous flux of such a straight tube fluorescent lamp, a large integrating sphere having an inner diameter of 3 m or greater is required.

As such, a relatively large integrating sphere is required for evaluation of a total luminous flux of a bar-shaped light source such as a fluorescent lamp. This requires effort and cost in terms of its fabrication and transportation. In addition, sometimes it is difficult to secure a space sufficient for installation of such a large integrating sphere.

SUMMARY OF THE INVENTION

The present invention is made to solve such a problem, and its object is to provide a total luminous flux measurement apparatus having a more compact configuration to achieve more accurate measurement of a total luminous flux, as well as a total luminous flux measurement method.

A total luminous flux measurement apparatus according to a certain aspect of the present invention includes: a main body configured to allow an object, which is a bar-shaped illuminant, to be attached thereto; an integrating unit having first and second holes allowing the object to penetrate the integrating unit in a longitudinal direction thereof; a relative movement mechanism for providing relative movement between the object and the integrating unit with the object penetrating the integrating unit; a measuring unit for measuring an illuminance within the integrating unit through an observation window provided at a location different from those of the first and second holes of the integrating unit; and a processing unit for calculating a total luminous flux emitted by the object based on illuminances measured by the measuring unit when the relative movement between the object and the integrating unit has been provided to expose a substantially entire light emitting surface of the object to an inner space of the integrating unit.

Preferably, the integrating unit includes a hemispherical unit having an inner wall surface provided with a light diffuse reflection layer, and a planar mirror disposed to block an opening of the hemispherical unit.

More preferably, the first hole is provided in the planar mirror at a substantial center of curvature of the hemispherical unit, and the second hole is provided at an intersection of the hemispherical unit with a line normal to said planar mirror and passing through said first hole.

More preferably, the total luminous flux measurement apparatus further includes a regulating unit, having a tubular shape, for regulating a portion of the light emitting surface of the object from being exposed to the inner space of the integrating unit, wherein the regulating unit communicates with the second hole and has a reflective layer at its surface exposed to the inner space of the integrating unit.

More preferably, the regulating unit is configured so that in the light emitting surface of the object, a longitudinal length of a portion to be exposed to the inner space of the integrating unit is equal to or smaller than ⅝ of a radius of the hemispherical unit.

Alternatively, the integrating unit includes a spherical unit having an inner wall surface provided with a light diffuse reflection layer, and a baffle provided between the light emitting surface of the object and the observation window. The total luminous flux measurement apparatus further includes first and second regulating units, each having a tubular shape, for regulating a portion of the light emitting surface of the object from being exposed to the inner space of the integrating unit, wherein: the first regulating unit communicates with the first hole, and has a reflective layer at its surface exposed to the inner space of the integrating unit, and the second regulating unit communicates with the second hole, and has a reflective layer at its surface exposed to the inner space of the integrating unit.

Preferably, the total luminous flux measurement apparatus further includes at least one light receiving unit for measuring a brightness of light emitted from a portion of the light emitting surface of the object outside the integrating unit, wherein based on a result of measurement of the brightness by the at least one light receiving unit, the processing unit corrects variation of a light emission characteristic in the object so as to determine the total luminous flux.

Preferably, the relative movement mechanism updates relative positions between the object and the integrating unit in a stepwise manner by, for each time, a distance as long as a longitudinal length of a portion, to be exposed to the inner space of the integrating unit, in the light emitting surface of the object, and the processing unit accumulates illuminances respectively measured at the relative positions between the object and the integrating unit, so as to determine the total luminous flux.

A total luminous flux measurement method according to another aspect of the present invention includes the step of attaching an object, which is a bar-shaped illuminant, to a measurement apparatus. The measurement apparatus including an integrating unit having first and second holes allowing the object to penetrate the integrating unit in a longitudinal direction thereof, and a measuring unit for measuring an illuminance within the integrating unit through an observation window provided at a location different from those of the first and second holes of the integrating unit. The total luminous flux measurement method further includes the steps of: providing relative movement between the object and the integrating unit to expose a substantially entire light emitting surface of the object to an inner space of the integrating unit with the object penetrating the integrating unit; measuring illuminances at a plurality of relative positions using the measuring unit; and calculating a total luminous flux emitted by the object, based on the illuminances measured at the plurality of relative positions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
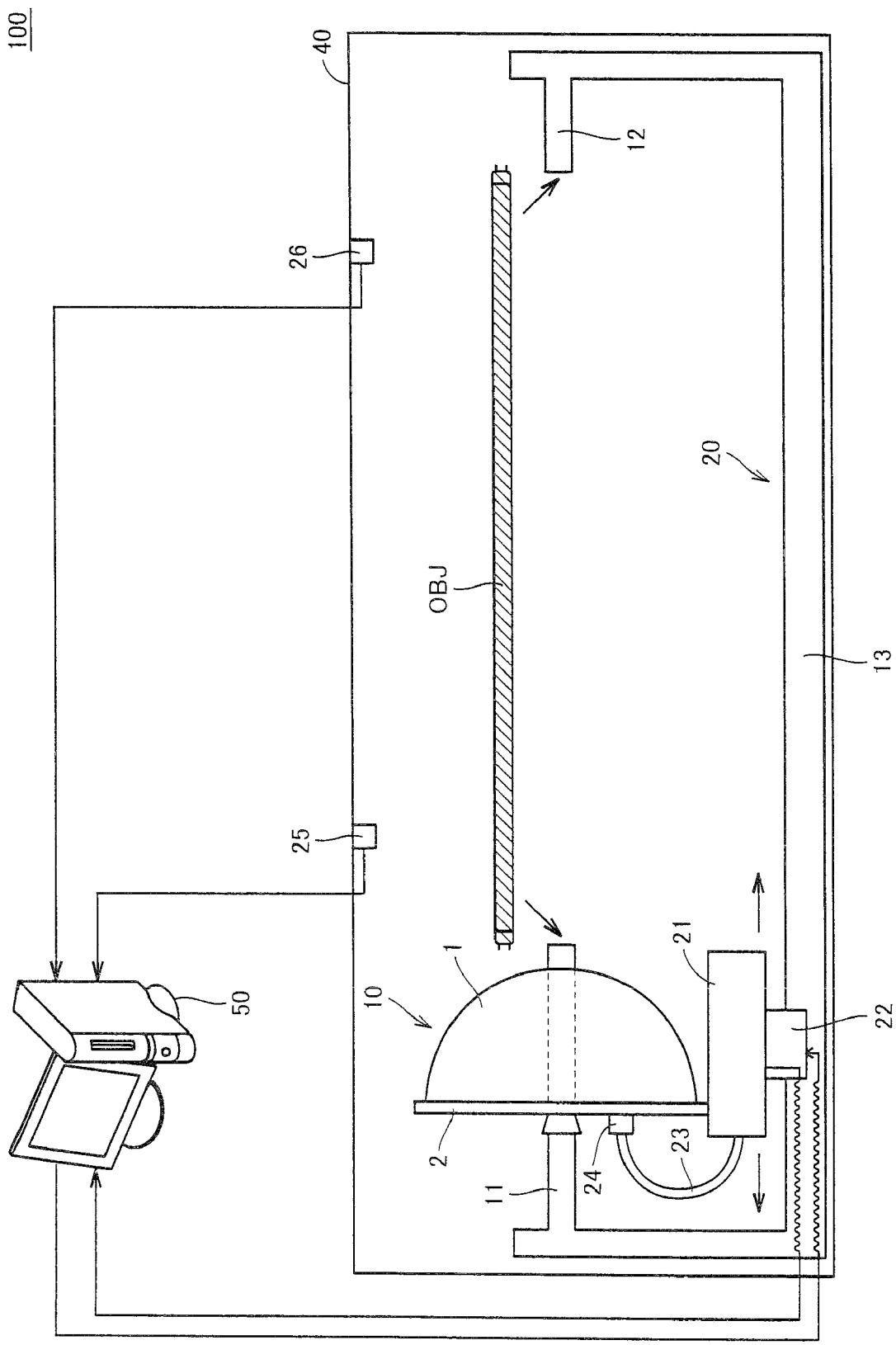
FIG. 1 is a schematic diagram showing a schematic configuration of a total luminous flux measurement apparatus according to a first embodiment of the present invention.

Embodiments of the present invention will be described below in detail with reference to figures. It should be noted that the same or equivalent portions in the figures are give the same reference characters and are not described repeatedly.

First Embodiment

Referring to FIG. 1, a total luminous flux measurement apparatus 100 according to the present embodiment includes a main body 20 disposed in a frame 40. Main body 20 is configured so that a bar-shaped illuminant, a light source to be subjected to measurement (hereinafter, also referred to as "object OBJ"), can be attached thereto. It should be noted that in the description below, a straight tube fluorescent lamp is exemplified as a typical bar-shaped illuminant, but an object whose total luminous flux is measured by total luminous flux measurement apparatus 100 according to the present invention is not limited to such a straight tube fluorescent lamp. For example, the present invention is applicable to a light source in which a plurality of light emitting elements such as LEDs (Light Emitting Diodes) are arranged in the longitudinal direction.

More specifically, main body 20 has lighting jigs 11 and 12. Lighting jigs 11 and 12 are disposed opposite to each other with a predetermined distance of separation therebetween. Each of lighting jigs 11 and 12 has an edge surface provided with a connector for supplying electric power to the straight tube fluorescent lamp. Hence, when the straight tube fluorescent lamp serving as object OBJ is attached between lighting jig 11 and lighting jig 12, the straight tube fluorescent lamp starts to be supplied with electric power. A mechanism for changing the distance of separation between lighting jig 11 and lighting jig 12 may be employed to allow straight tube fluorescent lamps of various sizes (lengths) to be arbitrarily attached therebetween. Specifically, an expanding/contracting mechanism such as a cylinder is provided in at least one of lighting jigs 11 and 12 and is operated depending on the length of an object OBJ. In this way, respective total luminous fluxes of straight tube fluorescent lamps of various lengths can be measured.

Total luminous flux measurement apparatus 100 further includes an integrating unit 10 having a pair of sample holes (indicated by reference characters 3 and 4 in FIG. 2) allowing object OBJ to penetrate integrating unit 10 in the longitudinal direction; and a measuring instrument 21 for measuring an illuminance within integrating unit 10 through an observation window (indicated by reference character 5 in FIG. 2) provided in a location different from those of the pair of sample holes provided in integrating unit 10.

Figure 2:
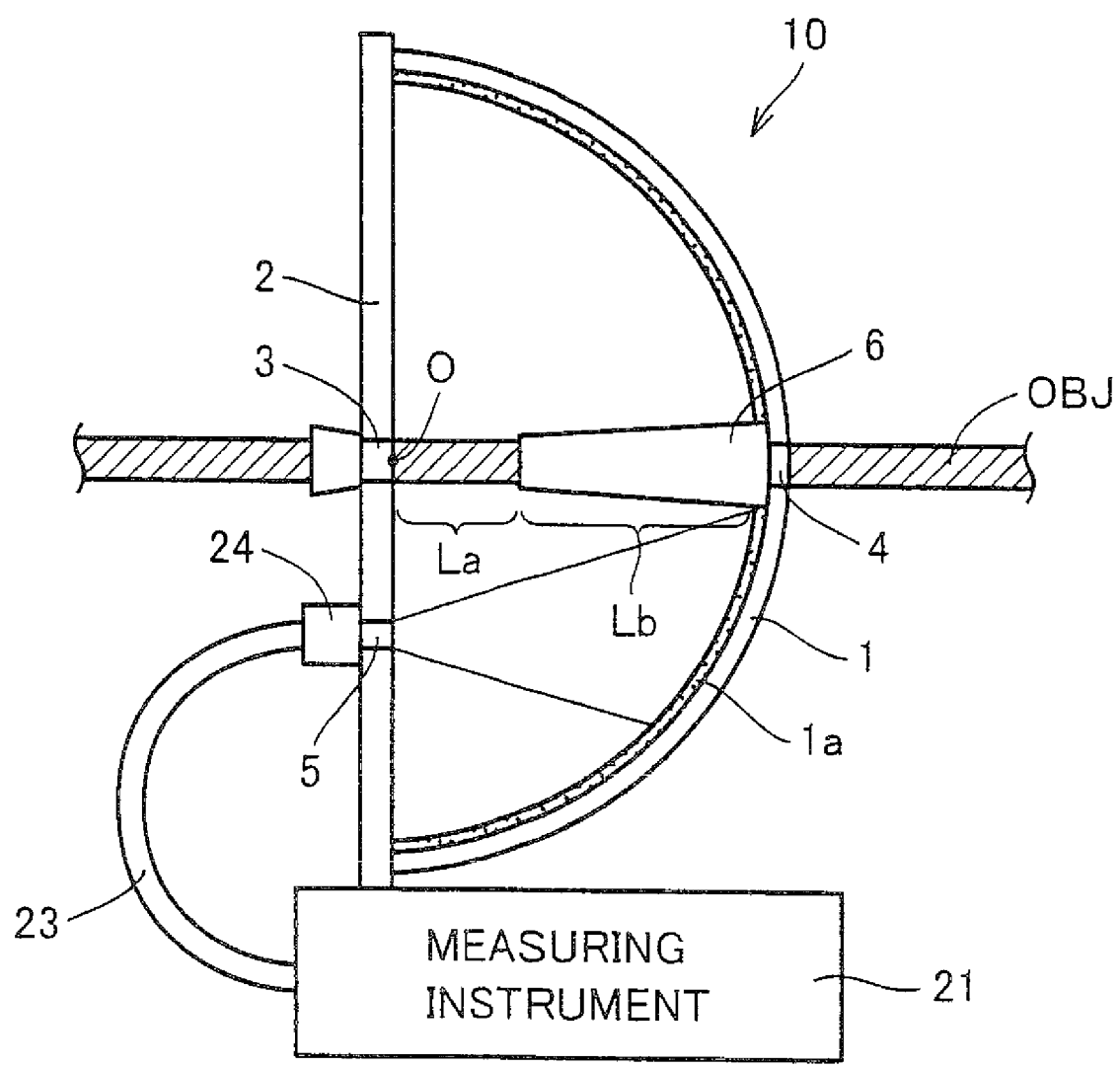
FIG. 2 is a schematic diagram showing configurations of an integrating unit and a measuring instrument shown in FIG. 1 more in detail.

Referring to FIG. 2, configurations of integrating unit 10 and measuring instrument 21 will be described in detail. As shown in FIG. 2, integrating unit 10 according to the present embodiment is a hemispherical type optical integrator. More specifically, integrating unit 10 includes a hemispherical unit 1 having a light diffuse reflection layer 1a on its inner wall surface, and a disc-shaped planar mirror 2 provided to block an opening of hemispherical unit 1. Light diffuse reflection layer 1a is formed typically by applying or spraying a light diffusing and reflecting material such as barium sulfate or PTFE. Planar mirror 2 is disposed to extend through a substantial center O of curvature of hemispherical unit 1 and to block the opening of hemispherical unit 1. Here, the term "substantial center O of curvature of hemispherical unit 1" representatively refers to a geometrical center of the inner side of hemispherical unit 1.

Further, planar mirror 2 is provided with sample hole 3 communicating the inner space of hemispherical unit 1 with the outside of hemispherical unit 1. Sample hole 3 is provided in planar mirror 2 at the substantial center of curvature of hemispherical unit 1. Furthermore, hemispherical unit 1 is provided with sample hole 4 formed at a location opposite to that of sample hole 3 to communicate the inner space of hemispherical unit 1 with the outside of hemispherical unit 1. More specifically, sample hole 4 is provided at an intersection of hemispherical unit 1 with a line normal to planar mirror 2 and passing through the location of sample hole 3.

Integrating unit 10 according to the present embodiment has an inner wall surface which causes repeated reflection of a luminous flux from object OBJ placed in the inner space of integrating unit 10. This repeated reflection provides a uniform illuminance to the inner wall surface of integrating unit 10. It should be noted that the uniform illuminance thus provided is a value proportional to (a part of) the total luminous flux from object OBJ. In other words, even though integrating unit 10 is of hemispherical type, it functions in a manner similar to that of a conventional integrating sphere. A reason for this will be described below.

Some luminous fluxes of those emitted from object OBJ placed in the inner space of integrating unit 10 enter the inner wall surface (light diffuse reflection layer 1a) of hemispherical unit 1 and are diffusely reflected therein. Meanwhile, the other luminous fluxes enter planar mirror 2 and are specularly reflected therein. On this occasion, planar mirror 2 optically forms a specular image of the inner wall surface of hemispherical unit 1. As described above, planar mirror 2 is disposed to extend through substantial center O of curvature of hemispherical unit 1, so a hemispherical space with a fixed curvature is formed between planar mirror 2 and hemispherical unit 1. Accordingly, illumination distribution equal to that obtained using an integrating sphere having a substantially spherical shape can be obtained by the real image within the hemispherical space defined by the inner wall surface (light diffuse reflection layer 1a) of hemispherical unit 1 as well as the specular image formed by planar mirror 2. In other words, it can be regarded as if two objects OBJ disposed symmetrical to each other within an integrating sphere of a spherical shape were both emitting luminous fluxes. Hence, integrating unit 10 of hemispherical type in the present embodiment functions as an optical integrator in a manner similar to that of a conventional integrating sphere.

Therefore, the concept of the "substantial center O of curvature of hemispherical unit 1" involves a proximal location where illumination distribution is substantially equal to that obtained using an integrating sphere having a spherical shape as described above, in addition to the complete center of curvature of hemispherical unit 1.

Planar mirror 2 is provided with observation window 5 for measuring an illuminance at the inner wall surface of integrating unit 10. Observation window 5 communicates between the inner space of hemispherical unit 1 and the outside of hemispherical unit 1. Further, an extracting coupler 24 is provided outside hemispherical unit 1 to communicate with observation window 5. The inner wall surface of hemispherical unit 1 is observed for an illuminance at its portion included within a range of a predetermined angle of view from observation window 5, and light corresponding to the illuminance observed is extracted by extracting coupler 24. The light thus extracted by extracting coupler 24 from integrating unit 10 is propagated through an optical fiber 23 and is led to measuring instrument 21.

It should be noted that observation window 5 may be provided in any location in hemispherical unit 1. In this case, however, object OBJ needs to be positioned at a location falling out of the exact range of field of view from observation window 5.

Measuring instrument 21 measures an illuminance of the light received via optical fiber 23, and outputs a result of the measurement to a processing unit 50. Measuring instrument 21 employed herein may be a measuring instrument for detecting illuminances for an entire range of wavelengths measured, or may be a spectroscopic type measuring instrument capable of detecting an illuminance for each wavelength. When a spectroscopic type measuring instrument is employed, the total luminous flux of object OBJ can be measured in consideration of wavelength dependency thereof.

Further, in the inner space of integrating unit 10, there is provided a light shielding tube 6 corresponding to a regulating unit for regulating a portion of the light emitting surface (light emitting portion) of object OBJ from being exposed to the inner space of integrating unit 10. Light shielding tube 6 has an internal tube portion communicating with sample hole 4, and has a reflective layer provided at its surface exposed to the inner space of integrating unit 10. More specifically, light shielding tube 6 has an outer surface processed to be a mirror surface and is configured in the form of a truncated cone having an inner diameter gradually getting smaller as it extends from sample hole 4 toward planar mirror 2, in order to reduce leakage of a luminous flux from the inner tube portion of light shielding tube 6, i.e., its portion not exposed to the inner space of integrating unit 10, into the inner space of integrating unit 10. It should be noted that there may be employed alternative means for reducing leakage of a luminous flux from the portion not exposed to the inner space of integrating unit 10.

Light shielding tube 6 is adapted to position the light emitting surface (light emitting portion) of object OBJ at the central portion of the optical spherical space that is constituted by the real image in the inner space of integrating unit 10 and the specular image corresponding to the inner space. In other words, light shielding tube 6 positions the light emitting surface (light emitting portion) of object OBJ away from the wall surface of integrating unit 10 and the wall surface of the specular image by a prescribed distance, so as to reduce an error in measurement.

Figure 3:
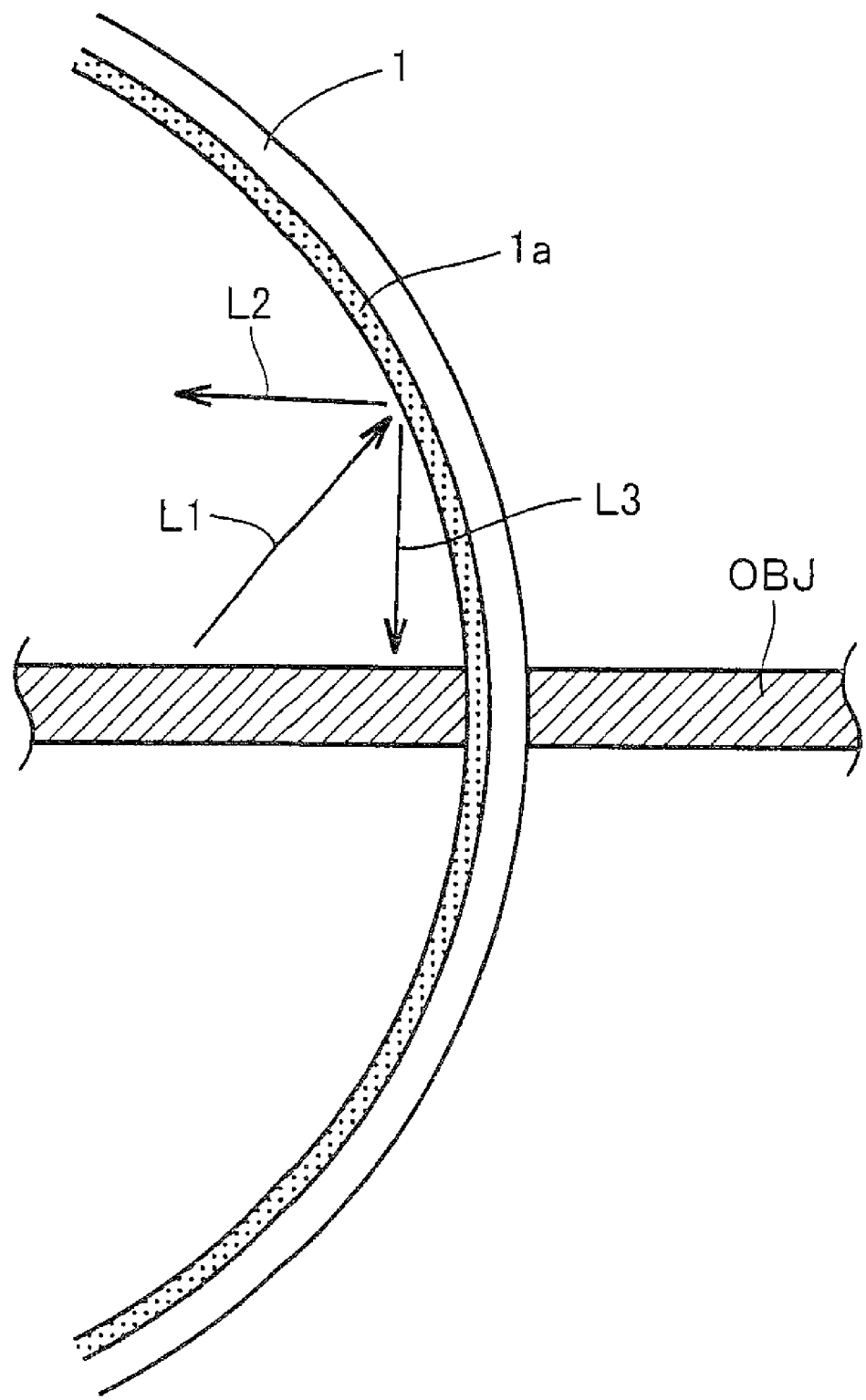
FIG. 3 is a schematic diagram illustrating an effect of reducing an error in measurement, provided by a regulating unit shown in FIG. 2.

Referring to FIG. 3, we assume a case where the light emitting surface (light emitting portion) of object OBJ is located in the vicinity of the inner wall surface of hemispherical unit 1. For example, when a luminous flux L1 emitted from object OBJ enters the inner wall surface of hemispherical unit 1 (light diffuse reflection layer 1a), a part of luminous flux L1 is reflected in a direction different from object OBJ to be diffusely-reflected light L2. The other part of luminous flux L1 reflected, diffusely-reflected light L3, enters object OBJ again. Since a diffusion reflection material or a specular reflection material is not necessarily used for the surface of object OBJ, diffusely-reflected light L3 thus coming back to object OBJ is absorbed in object OBJ. In other words, object OBJ itself casts a shadow, thereby introducing an error into the measured value.

In order to accommodate this, in the present embodiment, light shielding tube 6 is used to position object OBJ substantially distant away from the wall surface of the integrating space. In this way, the error in measurement caused by the above-described optical absorption in object OBJ can be reduced.

It should be noted that in the light emitting surface of object OBJ, the longitudinal length of a portion to be exposed to the inner space of integrating unit 10 is preferably 5/6 of the radius of hemispherical unit 1 or smaller than that. In other words, it is preferable that an exposure distance La of object OBJ shown in FIG. 2, a substantial length Lb of light shielding tube 6, and the like be designed appropriately to satisfy $La/(La+Lb) \leq 5/6$.

Referring to FIG. 1 again, total luminous flux measurement apparatus 100 further includes a drive carriage 22 for moving integrating unit 10 and measuring instrument 21 along a travel rail 13. Here, integrating unit 10 and measuring instrument 21 are fixed integrally onto drive carriage 22. Drive carriage 22 is moved in the axial direction along travel rail 13 in accordance with a command from processing unit 50 described below. More specifically, integrating unit 10 and measuring instrument 21 are moved in the longitudinal direction of object OBJ attached to lighting jigs 11 and 12. In other words, lighting jigs 11 and 12 for supplying power to object OBJ are formed on a straight line extending through the center of each of the pair of sample holes provided in integrating unit 10. Hence, when object OBJ is attached to lighting jigs 11 and 12, lighting jig 11, object OBJ, and lighting jig 12 are aligned with one another on the straight line.

Namely, drive carriage 22 and travel rail 13 correspond to a relative movement mechanism for providing relative movement between object OBJ and integrating unit 10 with object OBJ penetrating integrating unit 10.

In total luminous flux measurement apparatus 100 according to the present embodiment, a total luminous flux of object OBJ is calculated based on illuminances measured by measuring instrument 21 while integrating unit 10 moves relative to object OBJ so that the substantially entire light emitting surface of object OBJ will be exposed to the inner space of integrating unit 10. Namely, under conditions that object OBJ is disposed to penetrate integrating unit 10 from sample hole 3 to sample hole 4, a luminous flux of object OBJ at its portion locating within the inner space of integrating unit 10 is measured, and then integrating unit 10 is moved relative to object OBJ to measure another luminous flux of object OBJ at its portion accordingly contained in the inner space of integrating unit 10. In this way, the luminous fluxes of all the portions of the light emitting surface of object OBJ are measured sequentially while moving it and are accumulated to determine the total luminous flux of object OBJ.

Total luminous flux measurement apparatus 100 further includes processing unit 50. Processing unit 50 is responsible for various types of control and calculation processing relating to the above-described measurement of the total luminous flux. Typically, processing unit 50 is provided by installing in a general-purpose computer a program for providing the total luminous flux measurement method according to the present embodiment. A hardware configuration in this case is well-known, and is therefore not described herein in detail. Alternatively, all or a part of the functions provided by processing unit 50 may be implemented as dedicated hardware.

Total luminous flux measurement apparatus 100 further includes light receiving units 25 and 26 for measuring a brightness of light emitted from a portion of the light emitting surface of object OBJ outside integrating unit 10. Each of light receiving units 25 and 26 is typically constituted by a photo diode, a CCD (Charge Coupled Device), or the like, and transmits the value of measured brightness thereof to processing unit 50. Based on the result of measurement of brightness by light receiving units 25 and 26, processing unit 50 corrects variation in a light emission characteristic of object OBJ to determine the total luminous flux of object OBJ.

Namely, in the total luminous flux measurement apparatus according to the present embodiment, a portion of object OBJ is contained within integrating unit 10, so a heat radiation characteristic for the portion thus contained therein is deteriorated. Hence, the temperature of the coldest spot of object OBJ may be varied (typically, increased) to reduce a luminous flux from object OBJ. Here, in the case of a straight tube fluorescent lamp or the like, it can be regarded that the variation of light emission characteristic caused by the variation of the temperature of the coldest spot appears in the entire light emitting surface. Hence, by monitoring variation in brightness of the light from object OBJ, the variation of light emission characteristic in object OBJ can be detected. As such, by correcting a measured illuminance (proportional to the luminous flux) based on the variation of brightness, the total luminous flux of object OBJ can be measured with higher accuracy.

In total luminous flux measurement apparatus 100 according to the present embodiment, the total luminous flux of object OBJ can be accurately measured as long as no disturbance light enters the inner space of integrating unit 10 and no luminous flux leaks out of the inner space of integrating unit 10 in the respective relative positions. Hence, object OBJ does not need to be externally shielded (from light), necessarily. However, when correcting a light emission characteristic in object OBJ as described above, a brightness thereof needs to be measured with higher accuracy by light receiving units 25 and 26, so it is preferable to adopt as frame 40 a configuration allowing object OBJ to be shielded from its outer space.

Next, referring to FIGS. 4 and 5, a procedure of measurement in the total luminous flux measurement apparatus according to the present embodiment will be described.

Figure 4:
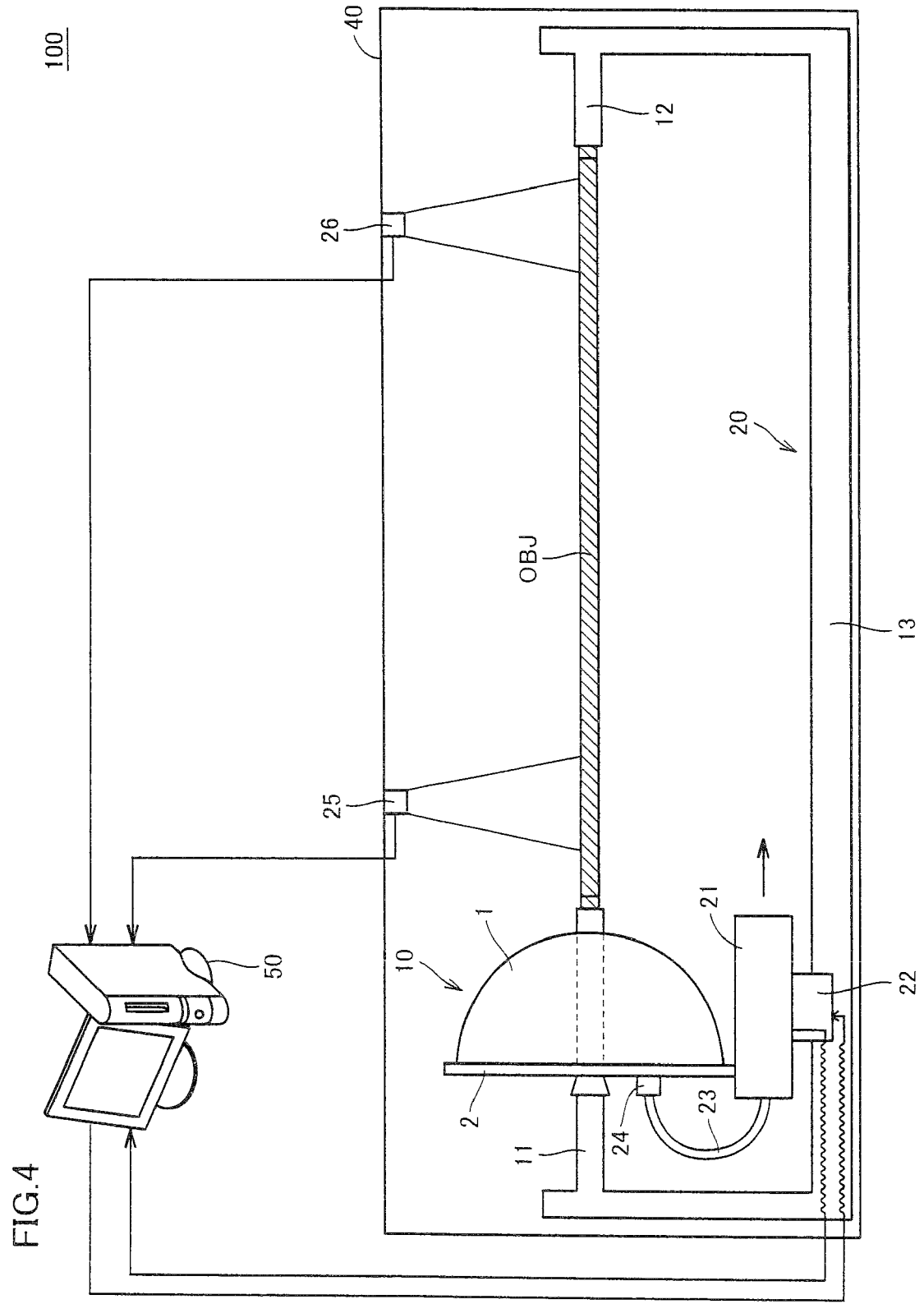
FIGS. 4 and 5 each illustrate a procedure of measurement in the total luminous flux measurement apparatus according to the first embodiment of the present invention.
Figure 5:
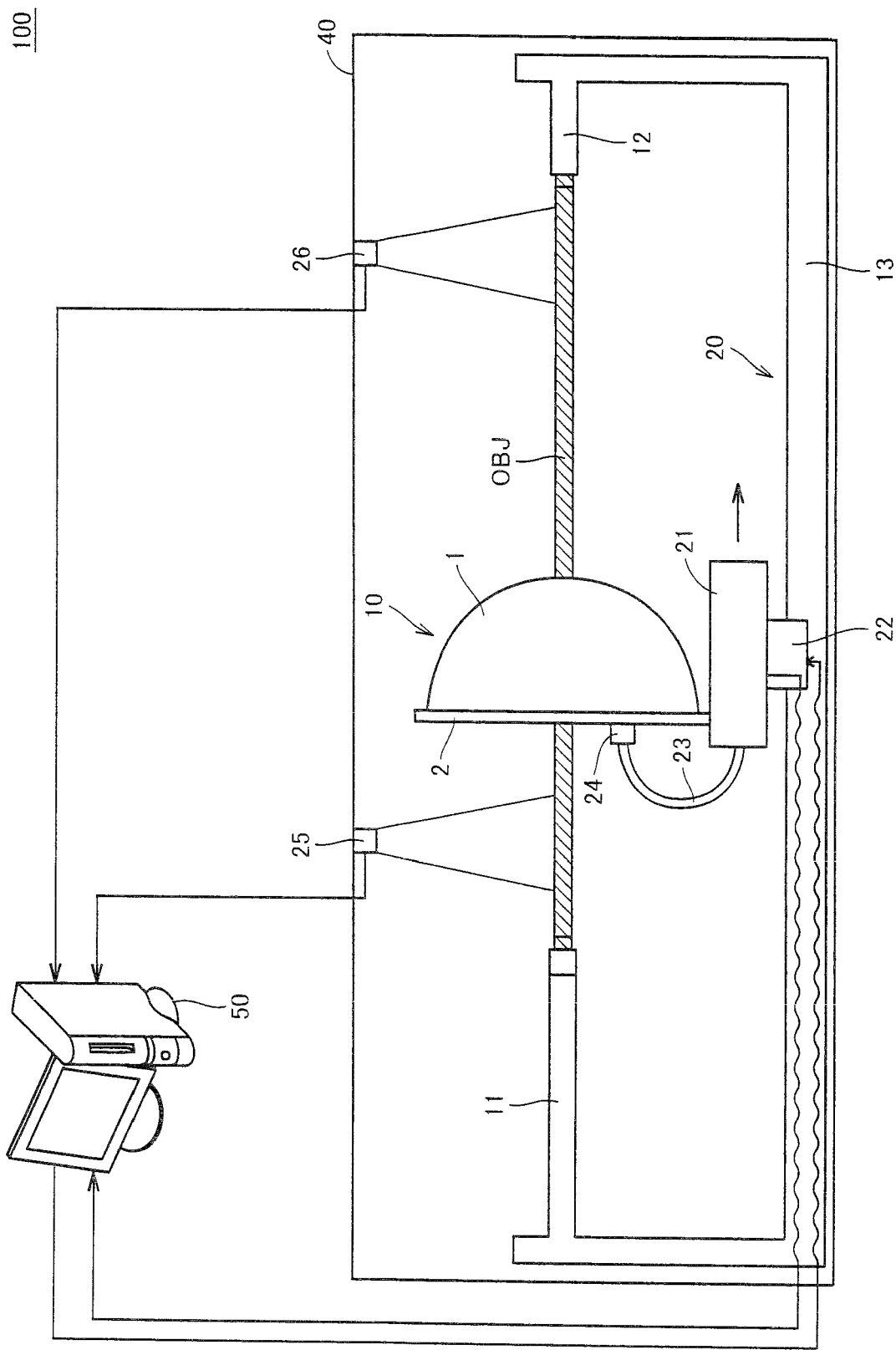

First, as described in FIG. 4, object OBJ is attached between lighting jig 11 and lighting jig 12 and is lit up. Then, object OBJ is aged until a luminous flux therefrom is stable. In this initial state, integrating unit 10 is set in a position in which only lighting jig 11 is exposed to the inner space of integrating unit 10.

After the luminous flux from object OBJ is stable, each of light receiving units 25 and 26 is used to measure a brightness of object OBJ, and the result of measurement is recorded as a brightness in the stable state (reference value). Thereafter, measurement of a total luminous flux from object OBJ is started.

Namely, by providing a command from processing unit 50 to drive carriage 22, the position of integrating unit 10 relative to object OBJ is changed in a stepwise manner by, for each time, a distance as long as the longitudinal length (exposure distance La shown in FIG. 2) of a portion, to be exposed to the inner space of integrating unit 10, in the light emitting surface of object OBJ. Thus, as described in FIG. 5, integrating unit 10 is moved in a stepwise manner from the left side to the right side in the plane of drawing.

In each of the relative positions therebetween, measuring instrument 21 measures an illuminance within integrating unit 10. For the measurement, integrating unit 10 is sequentially moved so that the light emitting surface of object OBJ will be exposed completely to the inner space of integrating unit 10. In other words, commands are sequentially provided to drive carriage 22 so that the total of the respective exposed surfaces of the portions of object OBJ subjected to the measurement of illuminance by measuring instrument 21 substantially corresponds to the entire light emitting surface of object OBJ. By accumulating the illuminances respectively measured in the relative positions between integrating unit 10 and object OBJ, the total luminous flux from object OBJ is determined.

It should be noted that in order to determine the total luminous flux of object OBJ based on the illuminances measured by measuring instrument 21, it is necessary to obtain a conversion formula (conversion factor). The conversion formula is determined from a relation between a known luminous flux emitted from a standard light source and an illuminance measured with regard to the standard light source by the same integrating unit 10 and measuring instrument 21. Namely, a conversion factor of illuminance versus luminous flux is obtained in advance, and is used to determine a luminous flux of object OBJ based on a measured illuminance.

As described above, when measuring instrument 21 measures an illuminance within integrating unit 10, light receiving units 25 and 26 are commanded to measure a brightness of object OBJ. Based on the brightness thus measured by light receiving unit 25 and/or 26, a corresponding result of measurement by measuring instrument 21 (illuminance proportional to the luminous flux from object OBJ) is corrected. It should be noted that light receiving units 25 and 26 are provided to precisely obtain the brightness of object OBJ even when integrating unit 10 or the like, rather than object OBJ, is included in the field of view of either of the light receiving units depending on a position of integrating unit 10. It should be also noted that the number of the light receiving units is not limited to two as long as it is configured so that the brightness of object OBJ can be measured appropriately irrespective of a position of integrating unit 10.

Figure 6:
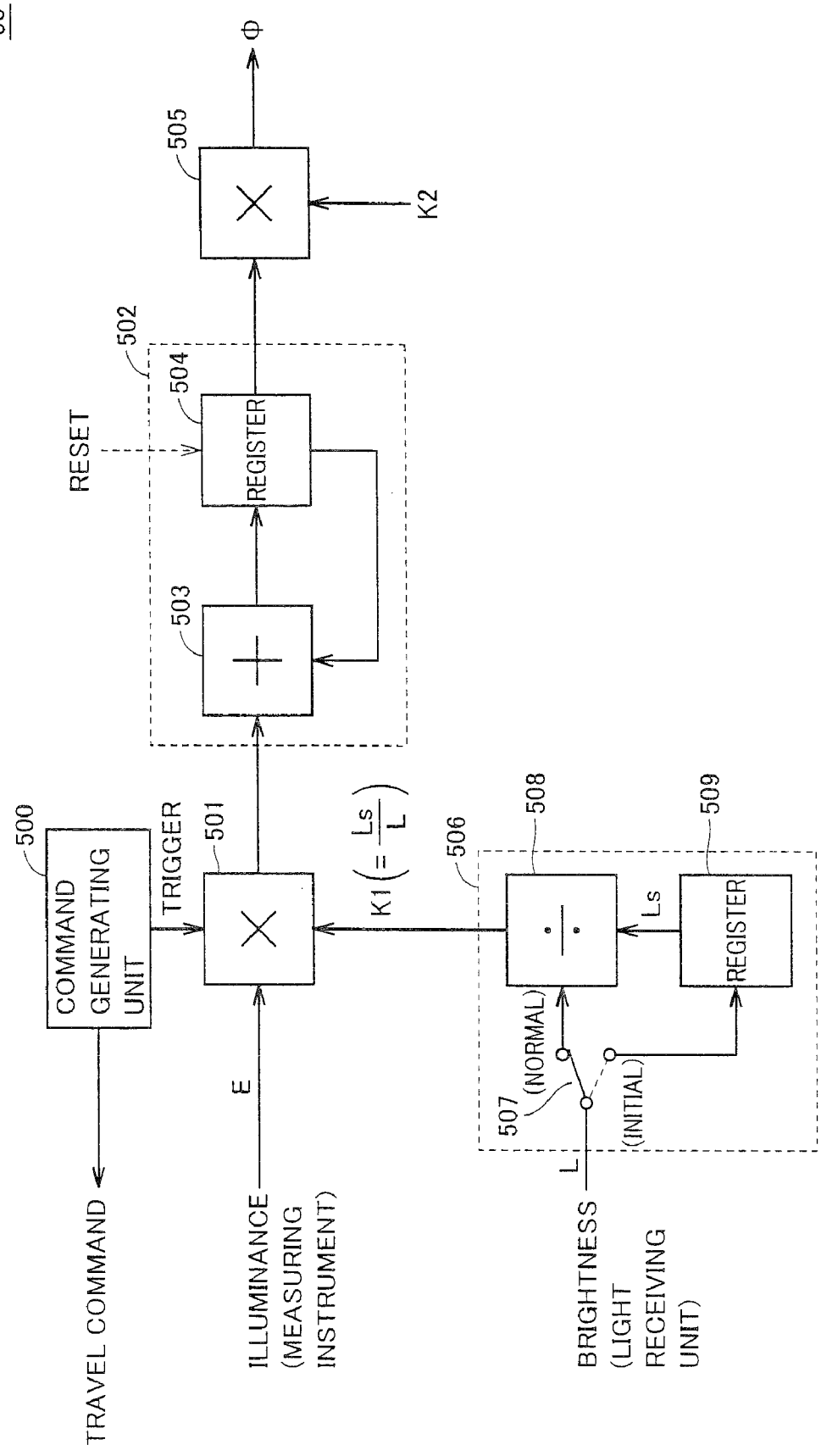
FIG. 6 is a schematic diagram showing a control structure in a processing unit in the first embodiment of the present invention.

FIG. 6 is a schematic diagram showing a control structure of processing unit 50 in the first embodiment of the present invention. Referring to FIG. 6, processing unit 50 receives an illuminance E measured by measuring instrument 21 and a brightness L measured by light receiving unit 25 and/or 26, and outputs a total luminous flux Φ of object OBJ. More specifically, processing unit 50 includes, as its control structure, a command generating unit 500, multipliers 501 and 505, an accumulator 502, and a correction coefficient calculating unit 506.

Command generating unit 500 generates a travel command for updating a relative position between integrating unit 10 and object OBJ in a stepwise manner, and sequentially sends it to drive carriage 22. The travel command may be information indicating an absolute position on travel rail 13 or may be information indicating a magnitude of movement (deviation of position) of drive carriage 22 for each step.

Multiplier 501 multiplies illuminance E measured by measuring instrument 21, by a correction coefficient K1 for correcting variation of a light emission characteristic in object OBJ. Multiplier 501 detects a timing at which the relative position between object OBJ and integrating unit 10 is updated, based on a trigger provided from command generating unit 500, and then operates. Further, multiplier 501 sends a determined, corrected illuminance (K1×E) to accumulator 502.

Accumulator 502 accumulates corrected illuminances sent from multiplier 501. Accumulator 502 operates with a timing at which some output is provided from multiplier 501. More specifically, accumulator 502 includes an adder 503 and a register 504. When register 504 receives a reset signal upon start of measurement, register 504 clears its value to zero and stores an accumulated value obtained in the measurement. When multiplier 501 outputs a new corrected illuminance, adder 503 reads out from register 504 the value accumulated until then, adds the received new corrected illuminance thereto, and stores in register 504 the accumulated value including the value thus added.

Multiplier 505 multiplies the accumulated value of (corrected) illuminances stored in register 504, by a conversion factor K2 obtained in advance, so as to determine total luminous flux Φ of object OBJ. As described above, conversion factor K2 is obtained in advance using a standard light source for generating a known luminous flux. It should be noted that conversion factor K2 may be determined after the measurement on object OBJ.

Correction coefficient calculating unit 506 determines correction coefficient K1 for correcting the variation of light emission characteristic in object OBJ. Specifically, correction coefficient calculating unit 506 includes a selector 507, a divider 508, and a register 509. Selector 507 sends a brightness measured by light receiving unit 25 and/or 26 to one of divider 508 and register 509. In other words, in the initial state, a brightness measured by light receiving unit 25 and/or 26 is stored in register 509. In measurement thereafter, a measured brightness is sent to divider 508. Register 509 stores a brightness (reference value) Ls obtained when object OBJ is stable. Divider 508 divides, in synchronism with the measurement of illuminance E by measuring instrument 21, brightness (reference value) Ls stored in register 509 by brightness L measured by light receiving unit 25 and/or 26, so as to determine correction coefficient K1(=Ls/L). A selector may be included therein to select a larger one from a brightness measured by light receiving unit 25 and a brightness measured by light receiving unit 26, in order to obtain a correct brightness even when integrating unit 10 obstructs the field of view of light receiving unit 25 or 26.

Figure 7:
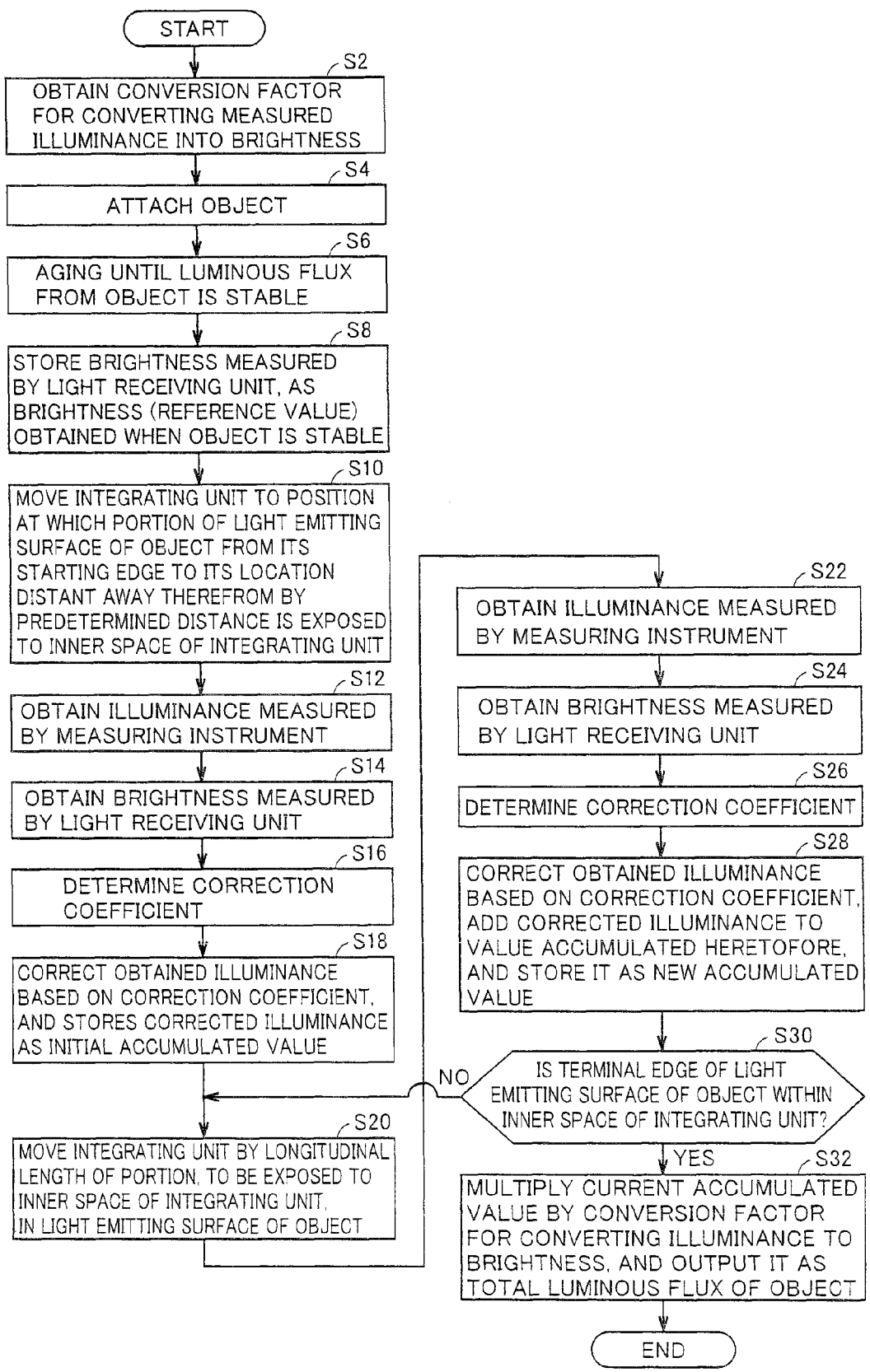
FIG. 7 is a flowchart showing a procedure of processes in a total luminous flux measurement method according to the first embodiment of the present invention.

FIG. 7 is a flowchart showing a procedure of processes in the total luminous flux measurement method according to the first embodiment of the present invention. Referring to FIG. 7, processing unit 50 first obtains a conversion factor for converting an illuminance measured by measuring instrument 21 into a brightness of object OBJ (step S2). Specifically, processing unit 50 reads out a conversion factor registered in advance, or prompts a user to input a conversion factor. Alternatively, as described above, a conversion factor may be determined using a standard light source.

Thereafter, the user attaches object OBJ between lighting jig 11 and lighting jig 12 for measurement of its total luminous flux (step S4), and object OBJ thus attached is aged until a luminous flux therefrom is stable (step S6). It is assumed that integrating unit 10 is at an initial position (position at which only lighting jig 11 shown in FIG. 4 is exposed to the inner space thereof). Once the aging is completed, the user provides a measurement start command to processing unit 50.

When receiving the measurement start command from the user, processing unit 50 stores a brightness measured by light receiving unit 25 and/or 26 as a brightness (reference value) Ls obtained when object OBJ is stable (step S8).

Then, processing unit 50 provides a travel command to drive carriage 22 so as to move integrating unit 10 to a position at which a portion of the light emitting surface of object OBJ from its starting edge to its location distant away therefrom by a predetermined distance is exposed to the inner space of integrating unit 10 (step S10). Then, processing unit 50 obtains an illuminance thereof measured by measuring instrument 21 (step S12), and obtains a brightness measured by light receiving units 25 and 26 (step S14) Then, processing unit 50 determines a correction coefficient K1 from the brightness obtained in step S14 and brightness (reference value) Ls obtained in step S8 (step S16), corrects the illuminance obtained in step S12 based on correction coefficient K1 thus determined, and stores the corrected illuminance as an initial accumulated value (step S18).

Thereafter, processing unit 50 provides a travel command to drive carriage 22 so as to move integrating unit 10 by the longitudinal length (exposure distance La shown in FIG. 2) of a portion, to be exposed to the inner space of integrating unit 10, in the light emitting surface of object OBJ (step S20). Then, processing unit 50 obtains an illuminance measured by measuring instrument 21 (step S22), and obtains a brightness measured by light receiving units 25 and 26 (step S24). Thereafter, processing unit 50 determines a correction coefficient K1 from the brightness obtained in step S24 and brightness (reference value) Ls obtained in step S8 (step S26). Based on correction coefficient K1 thus determined, processing unit 50 corrects the illuminance obtained in step S22, adds the corrected illuminance to the value accumulated heretofore, and stores it as a new accumulated value (step S28).

Further, processing unit 50 determines whether or not the terminal edge of the light emitting surface of object OBJ is within the inner space of integrating unit 10 (step S30). In other words, it determines whether or not all the portions of the light emitting surface of object OBJ have been exposed to the inner space of integrating unit 10. When the terminal edge of the light emitting surface of object OBJ is not within the inner space of integrating unit 10 (NO in step S30), the processes after step S20 are repeated.

On the other hand, when the terminal edge of the light emitting surface of object OBJ is within the inner space of integrating unit 10 (YES in step S30), processing unit 50 determines that measurement on all the portions of the light emitting surface of object OBJ has been completed, multiplies the current accumulated value by a conversion factor for converting an illuminance to a brightness, and outputs it as a total luminous flux of object OBJ (step S32). Then, the process is ended.

According to the first embodiment of the present invention, the integrating unit having a radius of approximately 30 cm is employed to allow for accuracy sufficient in practical use in measuring a total luminous flux. Hence, the length of the total luminous flux measurement apparatus according to the present embodiment can be reduced to a length including the longitudinal length of object OBJ, the radius (for example, approximately 30 cm) of the integrating unit, and respective lengths of additional devices. In other words, a relatively large optical integrator for containing an entire object therein does not need to be adopted. Thus, the size of the optical integrator can be reduced to ⅕ to 1/10 of that of a conventional configuration. Further, the integrator employed herein is of hemispherical type, so the entire size thereof is the half of a spherical integrator having the same radius. In this way, a more compact total luminous flux measurement apparatus can be realized.

According to the first embodiment of the present invention, since the hemispherical type integrator is employed, the observation window can be provided in any location as long as a luminous flux of object OBJ does not directly enter the observation window. Hence, no light shielding plate (baffle) needs to be provided between the light emitting surface of object OBJ and the observation window. If such a baffle is provided, an influence of optical absorption is relatively large, resulting in adverse effect on accuracy of measurement. Since the total luminous flux measurement apparatus according to the present embodiment does not need to be provided with such a baffle, integration efficiency in the integrating unit can be prevented from being decreased, thereby achieving improved accuracy in measuring a total luminous flux.

Second Embodiment

The foregoing first embodiment illustrates a configuration that employs a hemispherical type integrating unit, but a spherical type integrating unit may be employed. The following illustrates a configuration that employs such a spherical type integrating unit.

A schematic configuration of a total luminous flux measurement apparatus according to a second embodiment of the present invention has a configuration similar to that of total luminous flux measurement apparatus 100 according to the first embodiment shown in FIG. 1 apart from the configuration of its integrating unit, and therefore detailed explanation therefor will not be given repeatedly.

Figure 8:
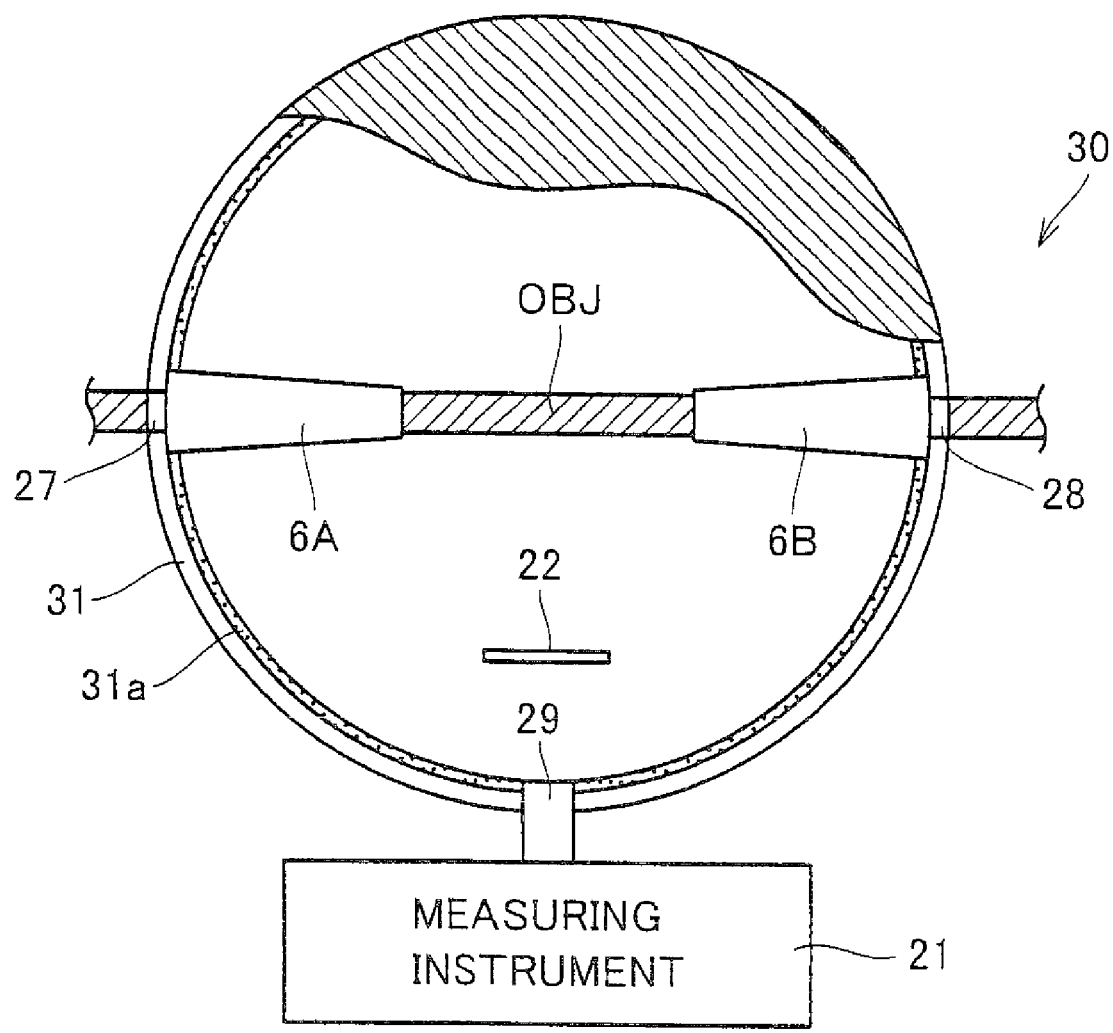
FIG. 8 is a schematic diagram showing configurations of an integrating unit and a measuring instrument in a second embodiment of the present invention.

FIG. 8 is a schematic diagram showing configurations of an integrating unit 30 and a measuring instrument 21 in the second embodiment of the present invention more in detail. Referring to FIG. 8, integrating unit 30 in the present embodiment is basically constituted by a spherical unit 31 having a light diffuse reflection layer 31a at its inner wall surface. Light diffuse reflection layer 31a can be formed by applying or spraying a light diffusing and reflecting material such as barium sulfate or PTFE, as with light diffuse reflection layer 1a of integrating unit 10 in the foregoing first embodiment. Spherical unit 31 is provided with a pair of sample holes 27 and 28 allowing an object OBJ to penetrate integrating unit 30 in the longitudinal direction. Further, in spherical unit 31, an observation window 29 is provided at a location different from those of the pair of sample holes 27 and 28. Typically, sample holes 27 and 28 are positioned at respective intersections of spherical unit 31 with a straight line extending through the central point of the inner surface of spherical unit 31. Observation window 29 is located at an intersection of spherical unit 31 with a straight line extending through the central point of the inner surface of spherical unit 31 and orthogonal to the straight line on which sample holes 27 and 28 are disposed.

The total luminous flux measurement apparatus according to the present embodiment further includes measuring instrument 21 for measuring an illuminance within integrating unit 30 through observation window 29. The configuration of measuring instrument 21 is the same as that in the first embodiment, and is therefore not described in detail repeatedly. Further, in the inner space of integrating unit 30, a light shielding plate (baffle) 22 is provided between the light emitting surface of object OBJ and observation window 29. Baffle 22 reduces a luminous flux emitted from object OBJ and directly entering measuring instrument 21 via observation window 29, so as to improve accuracy of measurement.

Further, in the inner space of integrating unit 30, light shielding tubes 6A and 6B are disposed to serve as regulating units for regulating a portion of the light emitting surface (light emitting portion) of object OBJ from being exposed to the inner space of integrating unit 30. Light shielding tube 6A has its inner tube portion communicating with sample hole 27, and has a reflective layer provided at its surface exposed to the inner space of integrating unit 30. Likewise, light shielding tube 6B has an inner tube portion communicating with sample hole 28, and has a reflective layer provided at its surface exposed to the inner space of integrating unit 30. More specifically, each of light shielding tubes 6A and 6B has an outer surface processed to be a mirror surface and is configured in the form of a truncated cone having an inner diameter gradually getting thinner from sample hole 27 or 28 toward the central portion of integrating unit 30, in order to reduce leakage of a luminous flux from the inner tube portions of light shielding tubes 6A and 6B, i.e., the portions thereof not exposed to the inner space of integrating unit 30, into the inner space of integrating unit 30. It should be noted that there may be employed alternative means capable of reducing the leakage of luminous flux from the portions thereof not exposed to the inner space of integrating unit 30.

A reason why such light shielding tubes 6A and 6B are disposed is the same as described above with respect to FIG. 3. In other words, they are provided to reduce introduction of an error in measurement caused by optical absorption of object OBJ itself, by positioning object OBJ substantially distant away from the wall surface of the integrating space. The total luminous flux measurement apparatus according to the present embodiment is preferably configured so that in the light emitting surface of object OBJ, the longitudinal length of a portion to be exposed to the inner space of integrating unit 30 is $\frac{5}{6}$ of the diameter of spherical unit 31 or smaller than that.

A measurement procedure, a control structure, a processing procedure, and the like with the total luminous flux measurement apparatus according to the present embodiment are similar to those in the first embodiment, and are therefore not described in detail repeatedly.

According to the second embodiment of the present invention, an integrating unit having a diameter shorter than the longitudinal length of the object can be adopted, so a large integrating sphere for containing the entire object within its inner space does not need to be employed unlike in a conventional total luminous flux measurement apparatus. In this way, a more compact total luminous flux measurement apparatus can be realized.

Other Embodiment

Each of the foregoing first and second embodiments illustrates a configuration in which a relative position between an object and an integrating unit is updated in a stepwise manner and respective illuminances within the integrating unit are measured at relative positions. However, it may be configured so that a relative position between the object and the integrating unit is updated in a continuous manner, illuminances within the integrating unit are measured continuously, and a total luminous flux is determined from the result of measurement. In other words, illuminances continuously measured when continuously updating the relative position between the object and the integrating unit are integrated and the result of integration of the illuminances is normalized by a coefficient for a relative velocity. In this way, a total luminous flux from the object can be measured.

Each of the foregoing first and second embodiments illustrates a configuration in which object OBJ is fixed and the integrating unit is moved, but the integrating unit may be fixed and object OBJ may be moved.

Each of the foregoing first and second embodiments illustrates a more preferable configuration in which the variation of light emission characteristic in object OBJ is corrected based on the brightness of object OBJ, but such correction may not be made necessarily when measuring a total luminous flux of an illuminant having a small temperature dependency.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A total luminous flux measurement apparatus, comprising:
   a main body configured to allow an object, which is a bar-shaped illuminant, to be attached thereto;
   an integrating unit having first and second holes allowing said object to penetrate said integrating unit in a longitudinal direction thereof;
   a relative movement mechanism for providing relative movement between said object and said integrating unit with said object penetrating said integrating unit;
   a measuring unit for measuring an illuminance within said integrating unit through an observation window provided at a location different from those of said first and second holes of said integrating unit; and
   a processing unit for calculating a total luminous flux emitted by said object based on illuminances measured by said measuring unit when the relative movement between said object and said integrating unit has been provided to expose a substantially entire light emitting surface of said object to an inner space of said integrating unit.

2. The total luminous flux measurement apparatus according to claim 1, wherein:
   said integrating unit includes
      a hemispherical unit having an inner wall surface provided with a light diffuse reflection layer, and
      a planar mirror disposed to block an opening of said hemispherical unit.

3. The total luminous flux measurement apparatus according to claim 2, wherein:
   said first hole is provided in said planar mirror at a substantial center of curvature of said hemispherical unit, and
   said second hole is provided at an intersection of said hemispherical unit with a line normal to said planar mirror and passing through said first hole.

4. The total luminous flux measurement apparatus according to claim 3, further comprising a regulating unit, having a tubular shape, for regulating a portion of the light emitting surface of said object from being exposed to the inner space of said integrating unit, wherein said regulating unit communicates with said second hole and has a reflective layer at its surface exposed to the inner space of said integrating unit.

5. The total luminous flux measurement apparatus according to claim 4, wherein said regulating unit is configured so that in the light emitting surface of said object, a longitudinal length of a portion to be exposed to the inner space of said integrating unit is equal to or smaller than $\frac{5}{6}$ of a radius of said hemispherical unit.

6. The total luminous flux measurement apparatus according to claim 1, wherein:
   said integrating unit includes
      a spherical unit having an inner wall surface provided with a light diffuse reflection layer, and
      a baffle provided between the light emitting surface of said object and said observation window,
   the total luminous flux measurement apparatus further comprising first and second regulating units, each having a tubular shape, for regulating a portion of the light emitting surface of said object from being exposed to the inner space of said integrating unit, wherein:
   said first regulating unit communicates with said first hole, and has a reflective layer at its surface exposed to the inner space of said integrating unit, and
   said second regulating unit communicates with said second hole, and has a reflective layer at its surface exposed to the inner space of said integrating unit.

7. The total luminous flux measurement apparatus according to claim 1 further comprising at least one light receiving unit for measuring a brightness of light emitted from a portion of the light emitting surface of said object outside said integrating unit, wherein based on a result of measurement of the brightness by said at least one light receiving unit, said processing unit corrects variation of a light emission characteristic in said object so as to determine said total luminous flux.

8. The total luminous flux measurement apparatus according to claim 1, wherein:
said relative movement mechanism updates relative positions between said object and said integrating unit in a stepwise manner by, for each time, a distance as long as a longitudinal length of a portion, to be exposed to the inner space of said integrating unit, in the light emitting surface of said object, and
said processing unit accumulates illuminances respectively measured at the relative positions between said object and said integrating unit, so as to determine said total luminous flux.

9. A total luminous flux measurement method comprising the steps of:
attaching an object, which is a bar-shaped illuminant, to a measurement apparatus, said measurement apparatus including an integrating unit having first and second holes allowing said object to penetrate said integrating unit in a longitudinal direction thereof, and a measuring unit for measuring an illuminance within said integrating unit through an observation window provided at a location different from those of said first and second holes of said integrating unit;
providing relative movement between said object and said integrating unit to expose a substantially entire light emitting surface of said object to an inner space of said integrating unit with said object penetrating said integrating unit;
measuring illuminances at a plurality of relative positions using said measuring unit; and
calculating a total luminous flux emitted by said object, based on the illuminances measured at the plurality of relative positions.

* * * * *